United States Patent
Khokhar

[11] Patent Number: 5,899,418
[45] Date of Patent: May 4, 1999

[54] CABLE FASTENING DEVICE

[75] Inventor: Wasim Khokhar, Cordova, Tenn.

[73] Assignee: Thomas & Betts Corporation, Memphis, Tenn.

[21] Appl. No.: 08/746,827

[22] Filed: Nov. 18, 1996

[51] Int. Cl.$^6$ ...................................................... F16L 3/00
[52] U.S. Cl. ............................ 248/73; 248/70; 248/74.3; 248/222.12; 403/92
[58] Field of Search ................................ 248/73, 65, 51, 248/70, 74.3, 220.21, 220.22, 222.11, 222.12, 224.7, 226.11, 231.81, 289.11, 291.1, 514; 403/97, 93, 96, 92, 91, 98; 411/372, 373, 377, 431

[56] References Cited

U.S. PATENT DOCUMENTS

| | | | |
|---|---|---|---|
| 781,224 | 1/1905 | Ohmer | 248/291.1 X |
| 903,807 | 11/1908 | Bensley | 248/73 |
| 3,087,700 | 4/1963 | Carpenter et al. | 248/74.3 |
| 3,913,876 | 10/1975 | McSherry | 248/73 X |
| 4,614,452 | 9/1986 | Wang | 403/97 X |
| 4,826,379 | 5/1989 | Norden . | |
| 4,859,129 | 8/1989 | Kraus . | |
| 4,880,331 | 11/1989 | Zun | 403/97 X |
| 4,917,343 | 4/1990 | Wainscott | 403/907 X |
| 4,934,889 | 6/1990 | Kurosaki . | |
| 4,999,019 | 3/1991 | Kraus . | |
| 5,098,242 | 3/1992 | Schaty . | |
| 5,219,134 | 6/1993 | Morita et al. | 248/73 |
| 5,291,639 | 3/1994 | Baum et al. . | |
| 5,302,070 | 4/1994 | Kameyama et al. . | |
| 5,350,266 | 9/1994 | Espey et al. | 411/431 |
| 5,423,647 | 6/1995 | Suzuki . | |
| 5,538,208 | 7/1996 | Cordes et al. | 248/69 |
| 5,653,410 | 8/1997 | Stroeters et al. | 248/73 |

OTHER PUBLICATIONS

Thomas & Betts Corporation, *O.E.M. Technical Specification Electrical Components, Products & Systems*, pp. A/7–A/18, 1995.

Primary Examiner—Derek J. Berger
Assistant Examiner—Stephen S. Wentsler
Attorney, Agent, or Firm—Hoffmann & Baron, LLP

[57] ABSTRACT

A fastening device provides for the securement of an elongate member to a support structure. The fastening device includes a housing having a support portion for supporting the elongate member. The fastening device further includes a fixed component fixably securable to the support structure. The housing is insertable over the fixed component and may be variably positioned thereon at select angular orientations such that the support portion is variably positioned about the fixed component.

22 Claims, 8 Drawing Sheets

CABLE FASTENING DEVICE

FIELD OF THE INVENTION

The present invention relates generally to a cable fastening device. More specifically, the present invention relates to a studmount cable fastener for securing cable which may be variably positioned in order to accommodate a wide range of applications.

BACKGROUND OF THE INVENTION

Studmount cable fasteners are typically employed in machinery, duct work, motor vehicles or other applications in order to provide an attachment point to which electrical cable, wires, wire bundles, cables and the like may be secured. It is desirable to properly secure cables to a structural member so that the cable will not interfere with the operation of the device or other components. Proper securement is especially important when the cables or wires are located adjacent moving components or in adverse conditions. Wires or cables if not properly restrained may become caught or entangled resulting in the wires becoming frayed or cut. Such damage to the wires or cables may lead to component failure and possibly costly troubleshooting and repair.

Space constraints of a particular design may require the wiring to be located in a specific location in order to provide clearance for other components. The precise ideal location of cables or wiring harnesses may only be known upon the final assembly of the wiring to the structure due to various factors that are difficult to calculate in advance. Therefore, it is desirable to have a wiring mounting device which provides location flexibility for attaching the wire harness.

Prior art wire or cable fasteners include devices which are bolted or secured to a structural member. Such devices also include an opening through which a cable tie or strap may extend. The strap then may be wrapped around the wires or cable, thereby securing the wires to the structural member. Such fasteners, however, are typically fixedly secured to the structural member such that the wires to be secured must extend directly over or in close proximity to the mounting point. In many applications, the bolt holes, which are used to secure the wire fastener, are typically pre-formed in the structural member prior to the installation of the wires. If after installing the wires the optimum location in which the wires to be supported is not adjacent this hole, either another hole must be made or a special fixture must be formed to accommodate any location discrepancy.

Adjustable cable fasteners are known in the prior art, however, their adjustability and therefore their ability to accommodate any discrepancy is extremely limited. One example of such a cable fastener is disclosed in U.S. Pat. No. 5,538,208 to Cordes, et al. Cordes, et al. discloses a spacer mounting for electrical cable bundles and the like. The spacers include a pair of interlocking mounting members with each member having a saddle portion for engaging and holding the cable. In one embodiment, the mounting members are interlockable with one mounting member having a plug and the other mounting member including a socket which receives the plug. The mounting members are rotatable with respect to each other so that the saddles may be aligned to engage the cable. Both saddles contain slots through which cable ties may extend in order to aid in securing the cable.

In an alternative embodiment, the cable fastener of Cordes, et al. includes interlocking pins having locking heads that are used to hold the mounting members together. The members may be rotated relative to each other between two endpoints of an arcuate slot.

In both embodiments of Cordes, et al., since the cable mounting surface is in line with the units of the devices center of rotation, the device has only limited ability to accommodate cables running over the devices center of rotation. However, if the wire or cable runs adjacent to the center line of rotation, the device cannot be used to properly support the cable. Each end of the slot includes an interlocking section in which the pins will snap into upon rotation of the mounting members relative to each other.

In addition, the spacer mount of the first embodiment of Cordes, et al. does not provide rotational support for the cable since the mounting sections are freely rotatable relative to each other. While the second embodiment of Cordes, et al., does provide for the mounting parts to be locked relative to each other, the locking feature only occurs at the endpoints of the slot. Therefore, the cable must be correctly aligned with the saddle in either one of the two end positions so that the spacer mount may be properly secure the cable.

Accordingly, it is desirable to provide a cable fastener that may be securely fastened to a structural member and that can accommodate a variety of cable locations and have the ability to secure the cable in both a rotational and translational manner in a particular location.

SUMMARY OF THE INVENTION

It is an object of the present invention to provide a cable fastening device for securing an elongate structure to a support element.

It is a further object of the present invention to provide a fastening device for securing an elongate member to a support structure including a housing having a portion for attaching the elongate member to the housing. The fastening device further includes a fixed component which is fixably securable to the support structure. The housing is axially insertable on the fixed component and variably positionable at select angular orientations about the fixed component, such that the portion for attaching the elongate member to the housing is positionable about the fixed component.

It is a still a further object of the present invention to provide a fastening device wherein the housing is non-rotatably secured to the fixed component when the housing is inserted on the fixed component. In addition, the fixed component includes a center point and the portion for attaching the elongate member to the housing is radially offset from the center point. The fixed component includes a plurality of slots and the housing includes at least one projection. The projection is selectively engageable with one of the slots when the housing is inserted on the fixed component thereby preventing relative rotation between the housing and the fixed component.

In the efficient attainment of these and other objects, the present invention provides for a cable fastening device. The cable fastening device includes an elongate housing and a annularly shaped washer fixedly securable to a structural member. The housing includes a cover portion and cable holding portion. The cover portion is removably insertable on the washer. The cover portion includes a plurality of locking members projecting therefrom. The washer includes a plurality of spaced projections extending therefrom and about the washer perimeter. The spaced projections form a plurality of V-shaped slots. Each housing locking member is selectively engageable with one of the V-shaped slots when the cover portion is inserted on the washer thereby allowing for cable holding portion to be variably positioned about the washer.

As more specifically described by way of the preferred embodiment herein, the cable fastening device includes an elongate housing having two generally opposed ends. A annularly shaped cover portion is disposed at one of the ends and has at least one locking member projecting therefrom. A cable holder is disposed at the other end and includes an aperture sized to receive a strap for securing said cable. The cable fastening device further includes a washer having a plurality of triangularly-shaped spaced fingers extending therefrom The washer further includes an aperture extending through its center in order to accommodate a bolt used for fixedly securing the washer to a support element. The fingers defining a plurality of slots. The cover portion is adjustably positionable about the washer such that the locking member is selectively engagable in one of the slots when the cover is positioned on the washer thereby restricting rotation of said housing relative to said washer. The cover portion further includes at least one resilient tab disposed thereon, and the tab is engagable with the washer, thereby allowing the housing to be removably secured to the washer.

DETAILED DESCRIPTION OF THE PREFERRED EMBODIMENTS

Figure 1:
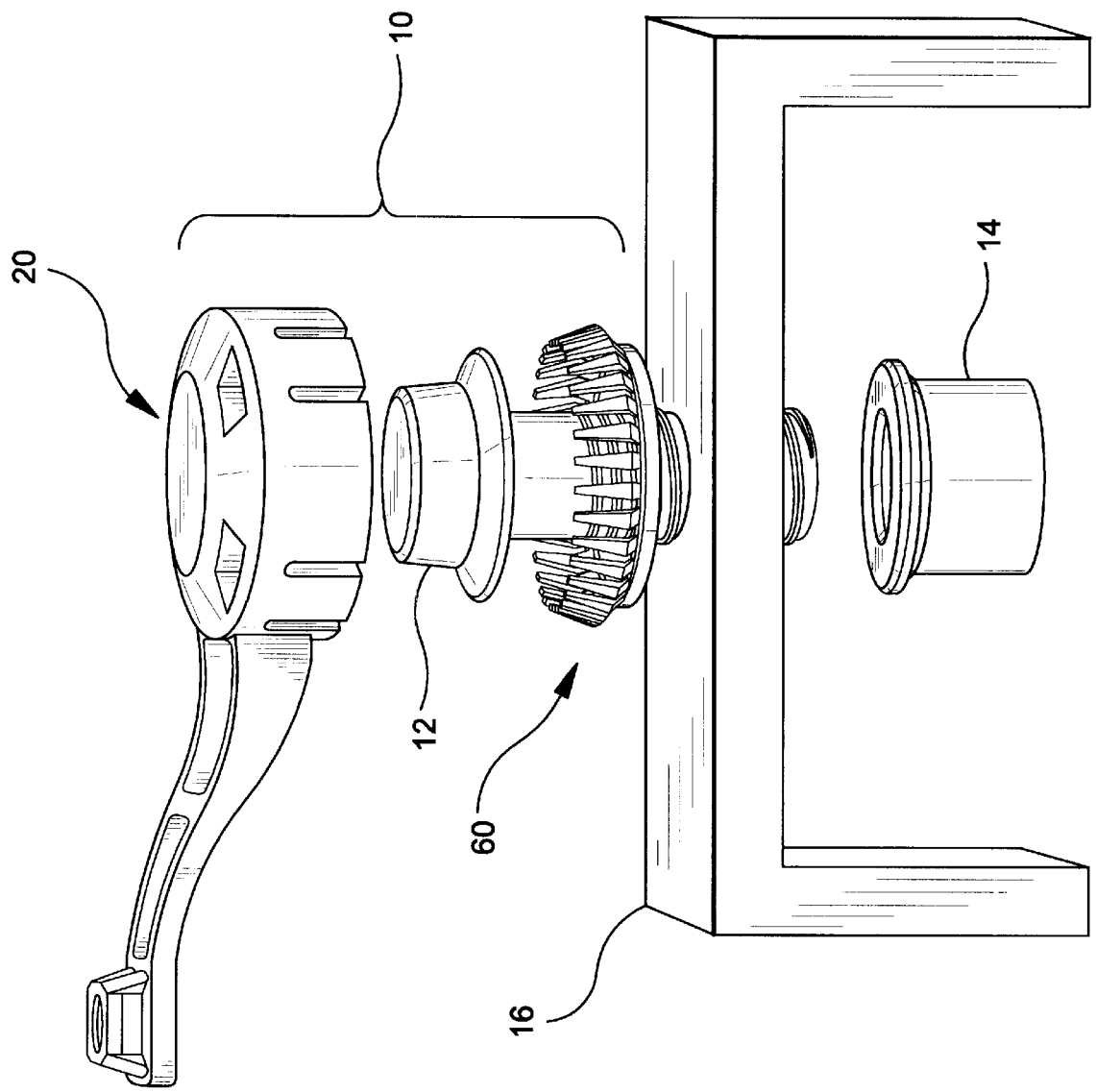
FIG. 1 is an exploded perspective view of the studmount cable fastener assembly on the present invention.

Referring initially to FIG. 1, the studmount cable fastener 10 of the present invention is shown. Cable fastener 10 is comprised of a handle-shaped housing forming a securement member 20 and an annular locking washer 60. Locking washer 60 may be secured to a structural member 16 by a cooperating bolt 12 and nut 14. Securement member 20 is removably securable to locking washer 60 and provides an attachment point for securing elongate members such as electrical wires, cable bundles, pipes, hoses, cables and the like 41. Throughout this disclosure, the term cable will be used, however, it is understood that this term refers to any type of elongate member which may be secured to cable fastener 10.

Figure 2:
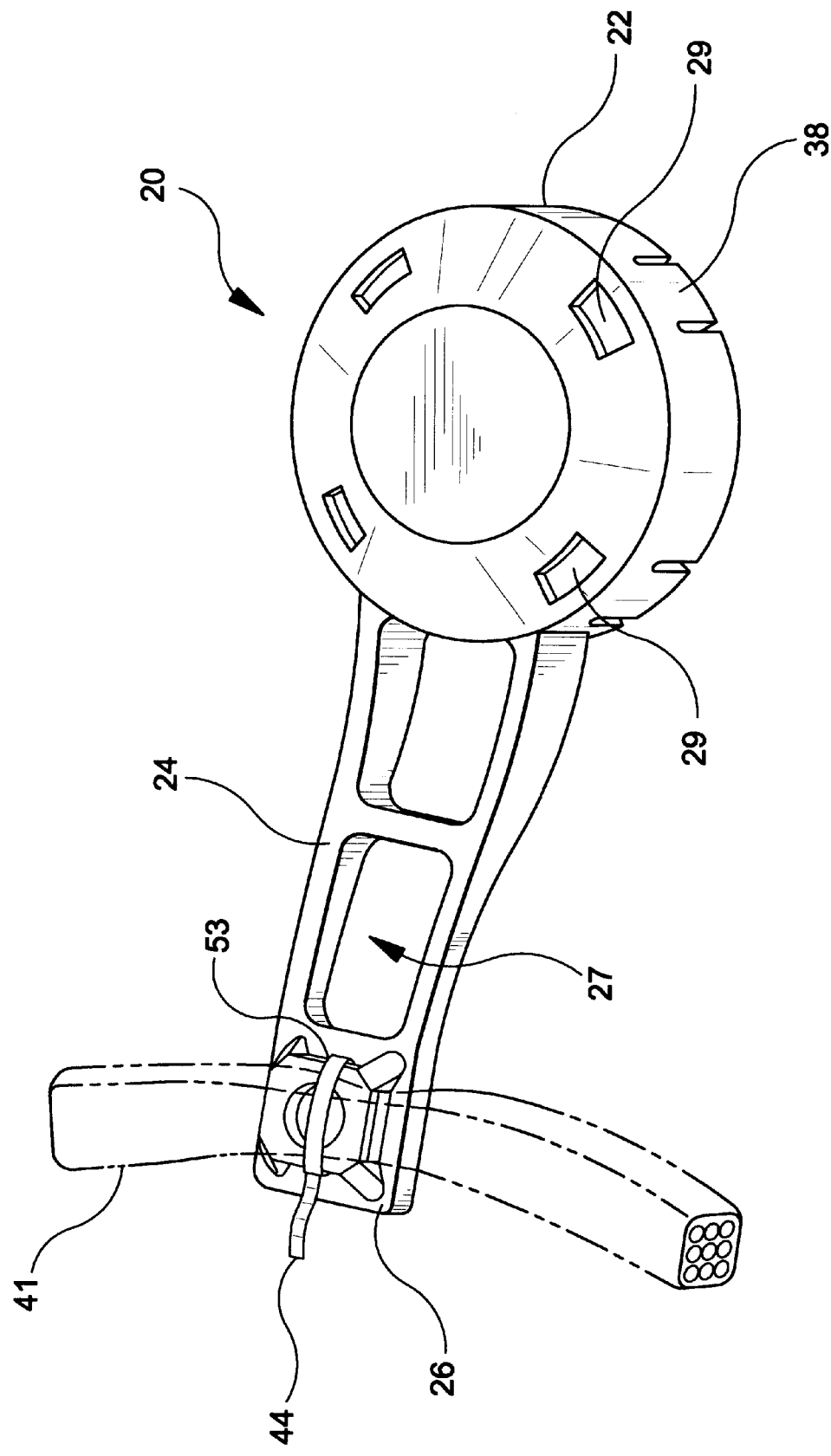
FIG. 2 is a top perspective view of a handle-shaped fastening member of the present invention showing a cable secured to the member with a cable tie.
Figure 3:
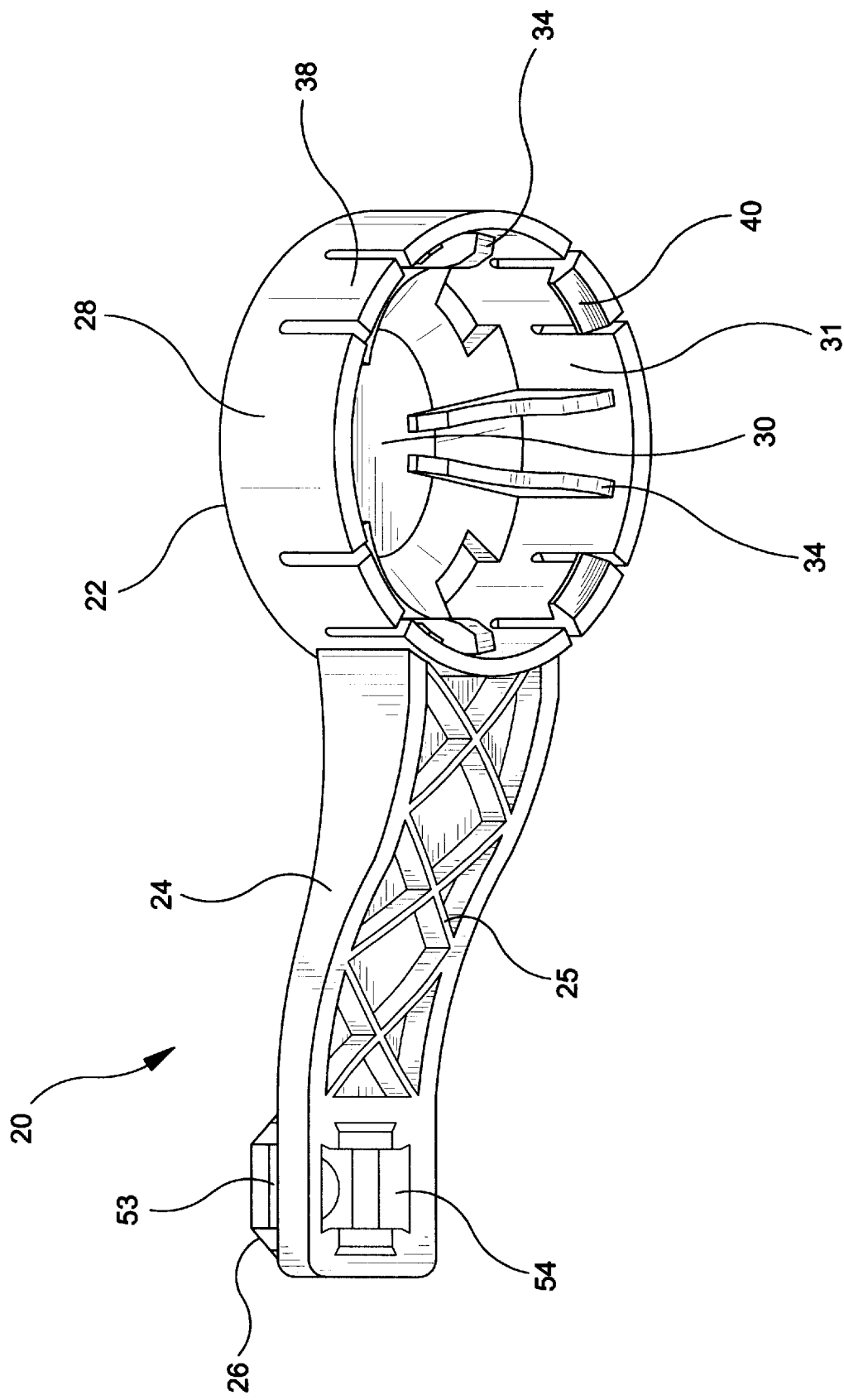
FIG. 3 is a bottom perspective view of the securement member of the present invention.
Figure 4:
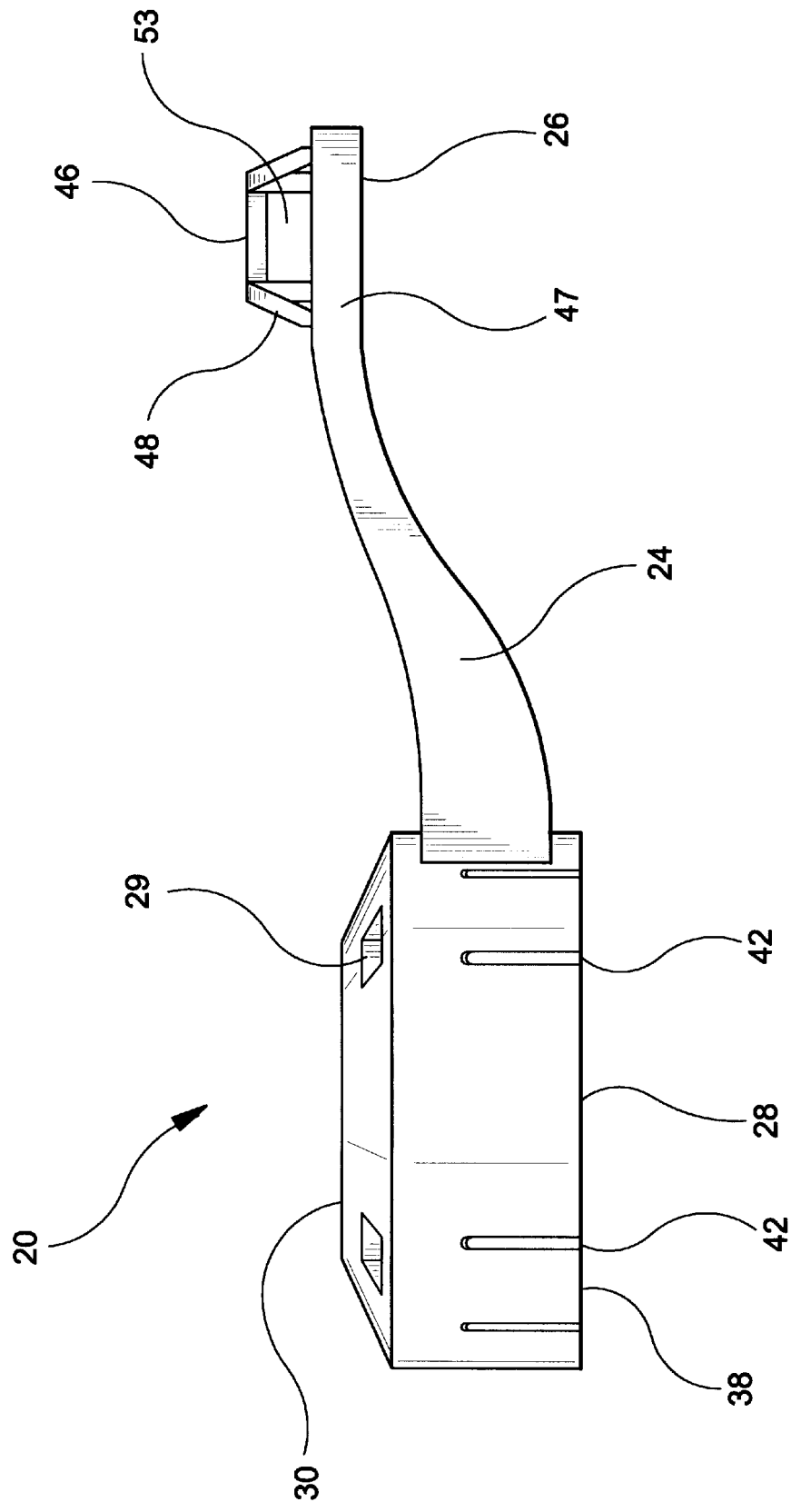
FIG. 4 is a side elevational view of the securement member of FIG. 3.
Figure 5:
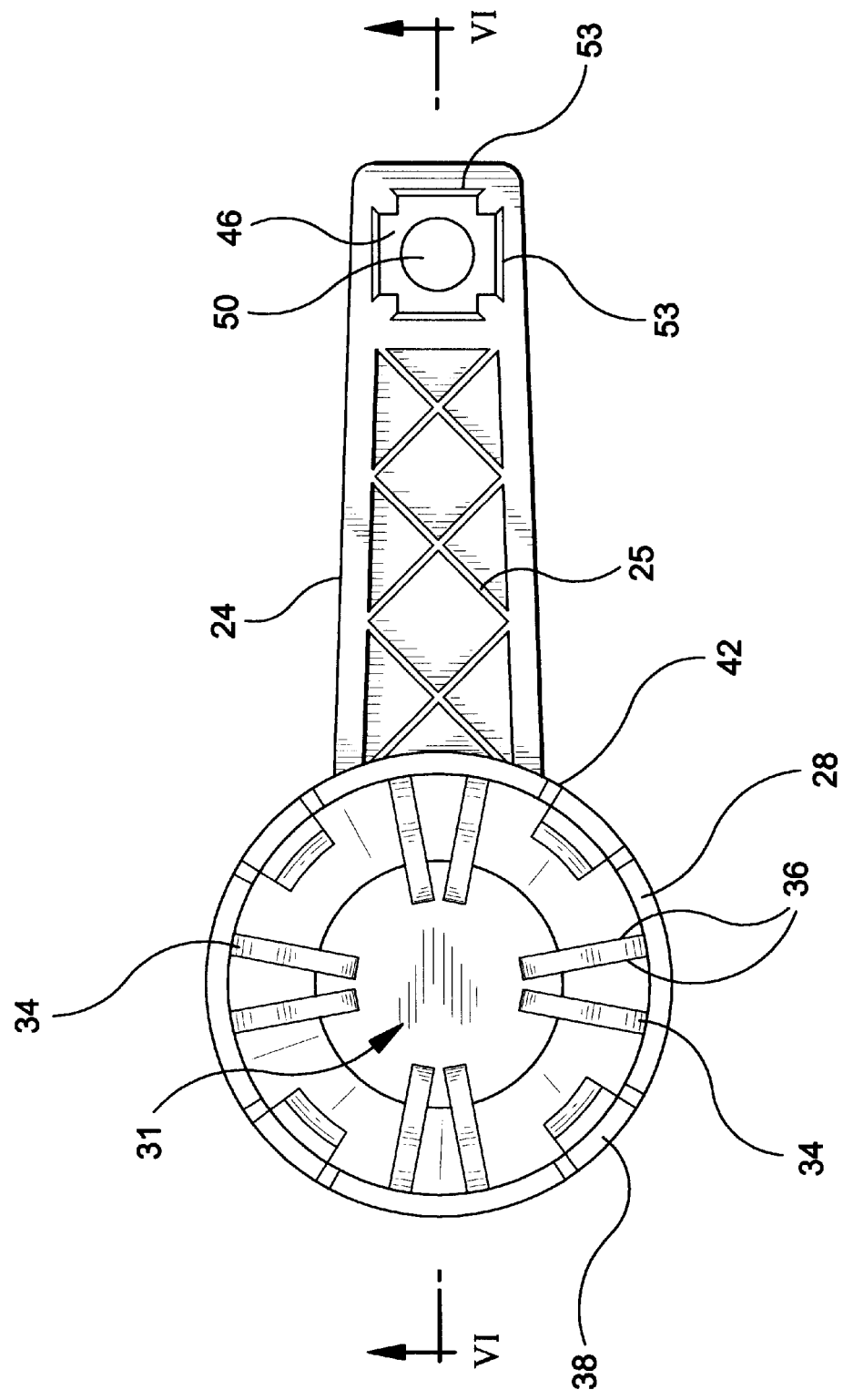
FIG. 5 is a bottom elevational view of the securement member of FIG. 3.
Figure 6:
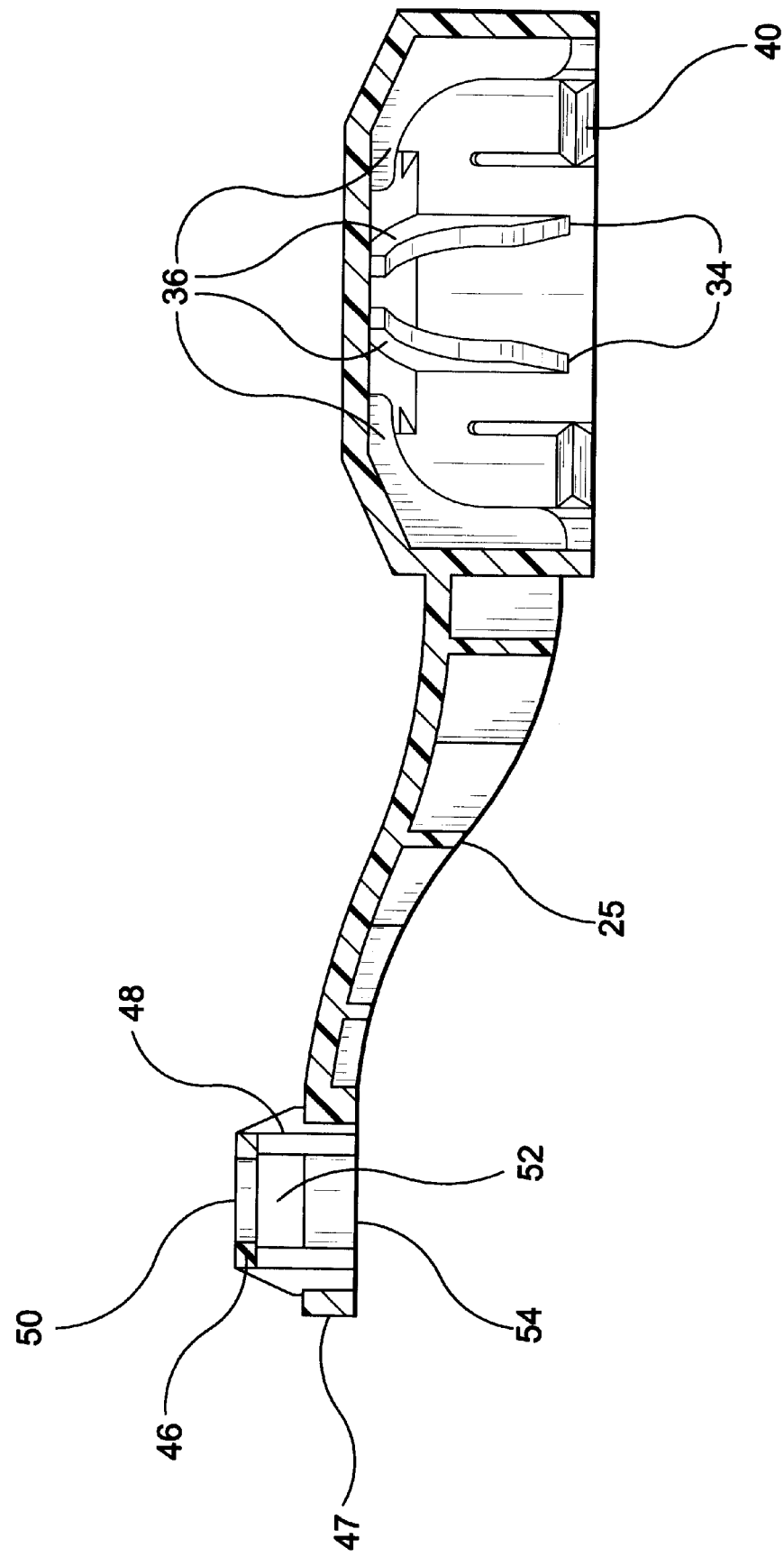
FIG. 6 is a cross-sectional view of the securement member taken along line VI—VI of end FIG. 5.
Figure 7:
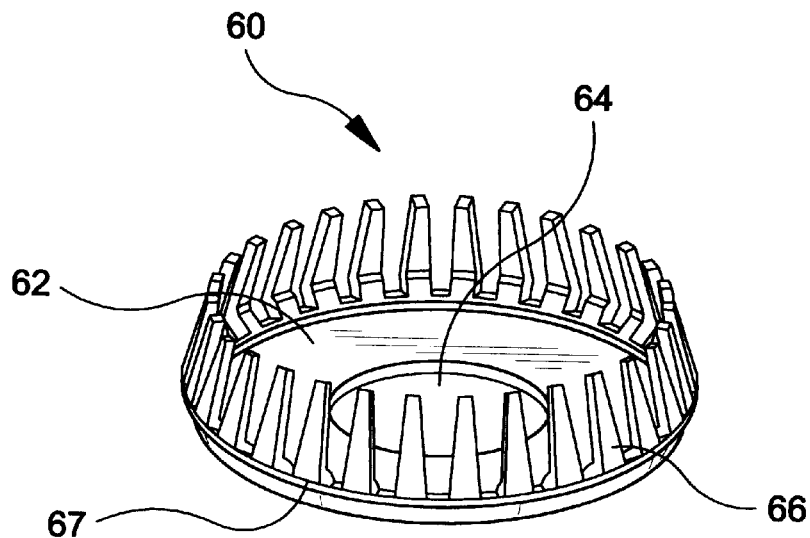
FIG. 7 is a side perspective view of a locking washer of the present invention.
Figure 8:
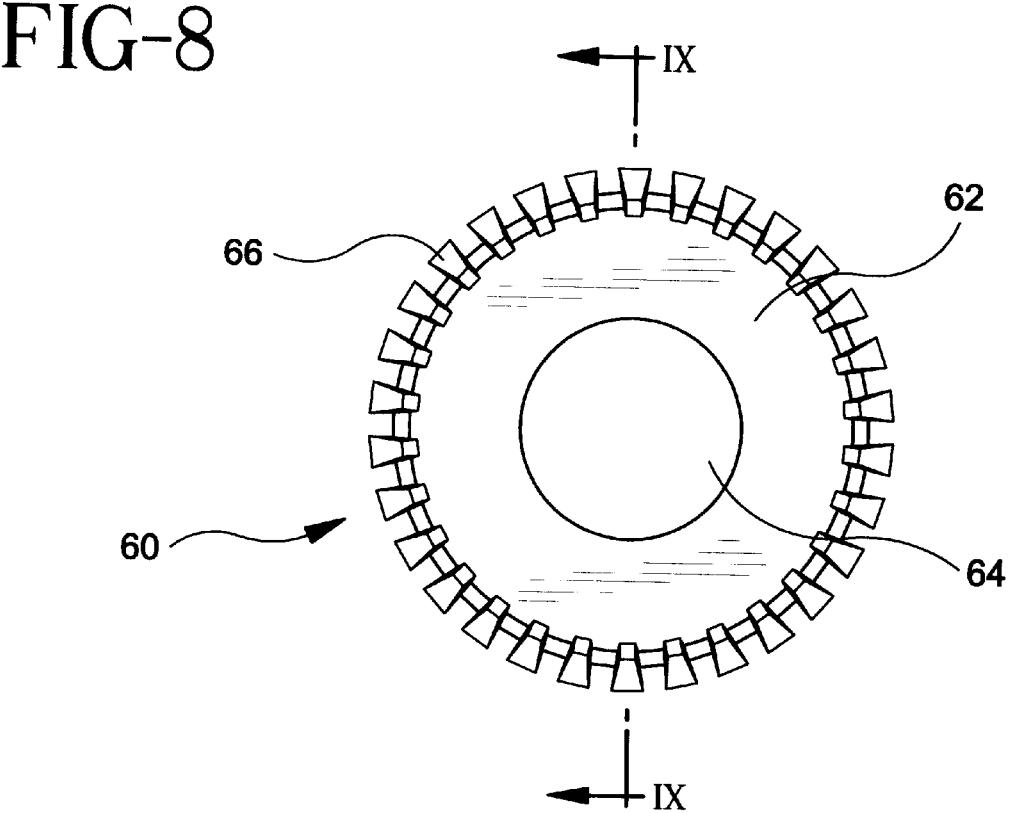
FIG. 8 is a top plan view of the locking washer of FIG. 7.

With reference to FIGS. 2–6, securement member 20 preferably includes an annularly shaped cover portion 22 and a cable holder portion 26 offset therefrom. An arm 24 extends between the cover portion 22 and holder portion 26. Arm 24 may be formed with the plurality of reinforcement ribs 25 as shown in FIGS. 3, 5 and 6 in order to provide structural reinforcement to the securement member. Alternatively, arm 24 may include sections 27 where material is removed in order to reduce the amount of material used in forming the member as shown in FIGS. 1 and 2. Securement member 20 is preferably formed of a polymer material with all its components being integrally formed.

As shown in FIGS. 3 and 4, cover portion 22 includes an annularly-shaped top 30 which is parametrically bounded by an outer wall 28 depending from top 30 forming a cover portion interior 31. Outer wall 28 may include a plurality of resilient tabs 38 formed between spaced-apart slots 42. Each tab 38 is attached at one end to outer wall 28 and has a distal end which includes a latch 40. Each latch 40 preferably has a triangular cross-section, and extends inwardly toward cover portion interior 31. Latches 40 are engagable with locking washer 60 and attach securement member 20 to washer 60 in a matter which will be described below.

Referring additionally to FIG. 2, for each tab 38, top 30 includes an aperture 29. Each aperture 29 is disposed adjacent to its corresponding tab and provides an opening through which a screwdriver or similar device may be inserted and used to urge the corresponding tab 38 outwardly. Once a tab is urged outwardly, it will be released from washer 60, and after all tabs 38 have been disengaged, securement member 20 may be removed from locking washer 60.

Securement member 20 also includes a plurality of locking members 34 disposed on the inside surfaces of top 30 and outer wall 28. Each locking member 34 is preferably a generally L-shaped member extending radially outwardly along top 30 and downwardly along outer wall 28. In addition, locking members 34 project generally orthogonally from the surface to which they are attached. Each locking member 34 has a pair of opposed side walls 36 which engage washer 60 in order to prevent rotation of securement member 20 relative to washer 60 in a manner which will be further described below.

Securement member 20 further includes a cable holder 26 that is formed at the end of arm 24 opposite cover portion 22. Accordingly, the cable holder 26 is offset from the center of the locking washer and securement point thereof when securement member 20 is secured to a locking washer 60. Cable holder 26 provides a mounting point to which cables, wire bundles, and the like may be secured to cable fastener 10. As shown in FIGS. 4 and 6, cable holder 26 preferably includes a generally square upper and base surface 46, 47. Upper surface 46 is supported above base surface 47 by a plurality of legs 48 extending between the corners of upper surface 46 and base surface 47. A space 52 formed between the upper and base surface creates openings 53 through which a strap or cable tie 44 may extend in order to secure the cable 41 to cable fastener 10, as shown in FIG. 2. A cable tie which may used for this purpose includes those manufactured by Thomas & Betts Corporation under the trademark TY-RAP.

Preferably, four openings 53 are formed between the legs 48 thereby permitting the strap cable tie to be oriented in a number of ways. In addition, openings 53 are preferably sized to accommodate cable ties having a width up to 0.305".

As shown in FIG. 5, cable holder 26 also includes an aperture 50 formed in the upper surface 46 in order to allow a strap to be inserted generally perpendicular to the longitudinal axis of the securement member 20. Aperture 50 may also accommodate a variety of standard bolt mounted cable fasteners. The aperture may also receive push-in type wiring harness holders and clips such as those manufactured and sold by Thomas & Betts Corporation bearing catalog number HCP438. In addition, the aperture may accommodate many other different styles of cable clamps. The base surface of cable holder 26 preferably includes a substantially rectangular aperture 54 so that straps or connectors extending through aperture 50 may extend directly through the securement member to provide additional means for securing cables thereto.

Figure 9:
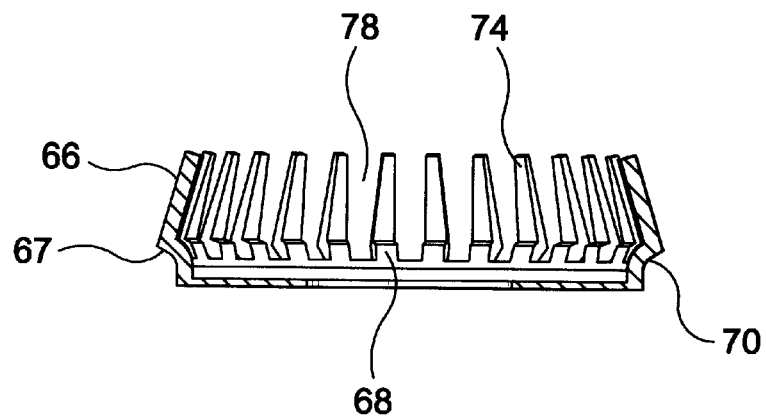
FIG. 9 is a sectional view of the locking washer taken along lines IX—IX of FIG. 8.
Figure 10:
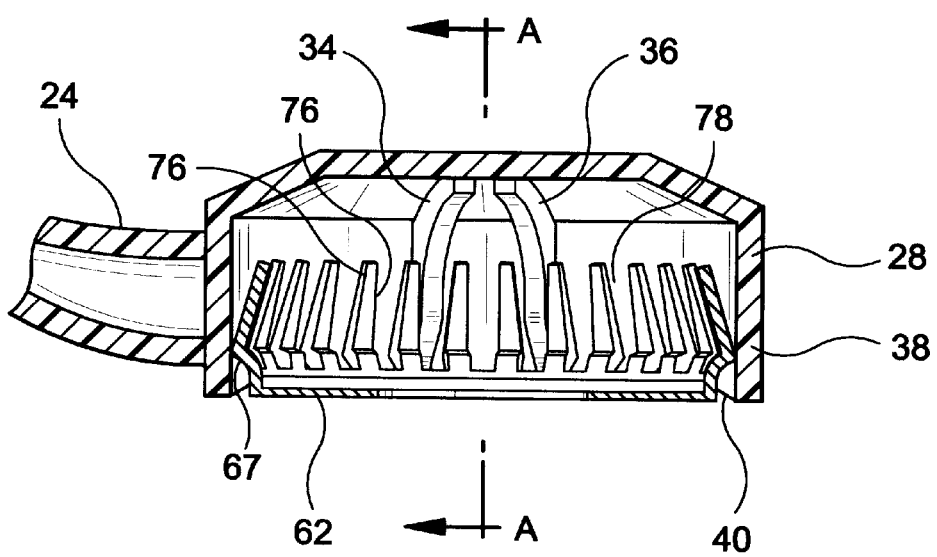
FIG. 10 is a sectional view of the securement member inserted on the locking washer.

Now referring to FIGS. 1, 7–10, locking washer 60 is a metallic member which includes a disk-shaped base 62 having a bolt clearance hole 64 therethrough. A plurality of spaced deflectable finger elements 66 are formed about the perimeter of base 62 and project generally upwardly therefrom. Each finger 66 includes a bottom and upper portion 68, 74 respectively. Each bottom portion 68 extends generally upwardly and outwardly forming a radius 70 as shown in FIG. 9. The entire group of radii 70 formed by all the fingers 66 forms an annular ridge 67 that is engageable with latches 40 of securement member 20.

Each finger upper portion 74 is preferably frusto triangular in shape and extends generally upwardly and radially inwardly. Additionally, each finger 66 includes side edges 76 which define generally V-shaped slots 78 that narrow as slot 78 descends towards base 62. Slots 78 are sized to receive locking members 34 of cover portion 22.

The relationship between securement member 20 and locking washer 60 will now be described. Locking washer 60 is typically fixedly secured to a structural member 16 by a bolt and nut combination as shown in FIG. 1. Once locking washer 60 is so attached, securement member 20 may then be axially positioned over washer 60 and urged into engagement therewith. When cover portion 22 is inserted over locking washer 60, locking members 34 enter V-shaped slots 78. Locking members 34 are so spaced on cover portion 22 such that when one locking member 34 is aligned with a particular V-shaped slot 78 all the remaining locking members 34 will also be aligned with a corresponding V-shaped slot 78. Once the locking members 34 have engaged a corresponding slot 78, the securement member 20 can no longer be rotated with respect to locking washer 60. Therefore, as torque is exerted upon securement member 20, side walls 36 of the locking members will bear against side edges 76 of the corresponding fingers 66 thereby resisting relative rotation between the securement member 20 and the locking washer 60. The preferred embodiment includes eight locking members 34. However, the present invention requires the use of only one locking member and it is also possible to have more than eight locking members 34. Since the locking members directly resist any rotational forces, it is preferable to have several locking members so that any torque exerted on securement member 20 can be adequately resisted.

As cover portion 22 is urged on to locking washer 60, latches 40 of tabs 38 engage the outer surface of fingers 66 and deflect slightly outwardly. When latches 40 pass annular ridge 67 they snap inwardly and return to an initial state thereby attaching securement member 20 to locking washer 60. Securement member 20 may then be removed from locking washer 60 by deflecting tabs 38 outwardly until they clear finger 66. Locking members 36 preferably engage slots 78 prior to latches 40 engaging the ridge 67, thereby allowing an installer to try various positions before the securement member is snapped onto the washer 60.

The preferred embodiment provides a great deal of flexibility for positioning the securement member 20 since securement member 20 may be axially insertable on locking washer 60 and variably positional or stepped angular orientation about locking washer 60. Therefore, securement member 20 may be placed in various positions 360° around the central axis A—A of locking washer 60. The preferred embodiment includes thirty V-shaped slots 78, thereby providing thirty different positions in which the securement member may be located. It is within the contemplation of the present invention that the number of slots 78 could be increased or decreased in order to vary the number of possible positions in which the securement member 20 may be fixed. By allowing for securement member to be positioned at a variety of fixed positions about locking washer 60, the cable holder 26 may be located at a point which is ideal for properly restraining the cable. Therefore, the cable need not pass directly over the center of the attachment point to the structural member in order for fastening device 10 to properly secure a cable. Accordingly, mounting holes may be pre-drilled in structural members prior to determining the precise location of the cable resulting in the reduction of time consuming work during installation of the cable or wiring.

Various changes to the foregoing described and shown structures would now be evident to those skilled in the art. Accordingly, the particularly disclosed scope of the intention is set forth in the following claims.

What is claimed is:

1. A fastening device for securing an elongate member to a support structure comprising:

a housing having a holding device for supporting said elongate member;

a fixed component fixably securable to said support structure, said fixed component comprising a generally planar disk-shaped base having a perimeter, said perimeter including a plurality of spaced fingers extending therefrom and said plurality of spaced fingers forming a plurality of slots therebetween; and said housing having a cover portion being axially insertable on said fixed component, said cover portion comprises at least one resilient member for attaching the housing to the fixed component by engaging said at least one resilient member with said fixed component, said housing is variably positionable at select angular orientations about said fixed component, such that said holding device is variably positionable about said fixed component to accommodate a position of said elongate member.

2. The fastening device of claim 1, wherein said housing is non-rotatably secured to said fixed component when said housing is inserted on said fixed component.

3. The fastening device of claim 2, wherein said fixed component includes a center point and said holding device is radially offset from said center point when said housing is inserted on said fixed component.

4. The fastening device of claim 3, wherein said housing includes at least one projection, said at least one projection being selectively engagable with one of said slots when said housing is inserted on said fixed component.

5. The fastening device of claim 4, wherein said fingers are frusto triangularly shaped and said slots formed therebetween are V-shaped.

6. The fastening device of claim 5, wherein said housing includes an elongate arm having a pair of opposed ends, said cover portion being disposed on one end of said arm and said holding device being disposed on said other end.

7. The fastening device of claim 6, wherein said cover portion includes a top parametrically bounded by an outer wall depending therefrom forming a cover interior and wherein said at least one projection extends from said cover portion toward said cover interior.

8. The fastening device of claim 7, wherein said at least one resilient member comprises a plurality of resilient tabs formed in said outer wall.

9. The fastening device of claim 7, wherein said at least one projection extends from a portion of said top and said outer wall.

10. The fastening device of claim 9, wherein said cover portion includes a plurality of projections each being engagable with one of said slots when said housing is inserted on said fixed component.

11. The fastening device of claim 6, wherein said at least one resilient member of said cover portion includes at least one resilient tab which is removably engagable with said fixed component such that said housing is removably securable to said fixed component.

12. The fastening device of claim 11, wherein said at least one tab includes a distal end having a latch extending therefrom, said latch being removably engagable with said fixed component.

13. The fastening device of claim 11, wherein said fingers each include a lower and upper portion, each of said lower portions extending generally outwardly from said base and each of said upper portions extending upwardly and inwardly towards said base.

14. The fastening device of claim 13, wherein said lower portion of said fingers forms an annular ridge, said at least one resilient tab being engagable with said ridge thereby securing said housing to said fixed component.

15. The fastening device of claim 1, wherein said holding device includes an aperture sized to receive a strap for securing said elongate member to said housing.

16. The fastening device of claim 15, wherein said holding device includes a planar upper surface spaced from an arm and said aperture being formed in said upper surface; and a plurality of legs extending between said upper surface and said arm, said upper surface and said arm defining a space therebetween, said space being sized to receive said strap.

17. The cable fastening device of claim 1, wherein said housing is formed of a polymer and said fixed component is formed of metal.

18. The fastening device of claim 1, wherein said fixed component includes an aperture extending through said base of said fixed component to accommodate mounting hardware for securing said fixed component to said support structure.

19. A cable fastening device comprising:

an elongate housing having two generally opposed ends;

cover portion disposed at one of said ends, said cover portion having at least one locking member projecting therefrom;

a cable holder is disposed at said other end of said two ends, said cable holder including an aperture sized to receive a strap for securing a cable;

a washer fixable to a support structure, said washer having a plurality of spaced-fingers extending therefrom, and said fingers defining a plurality of slots; and said cover portion being adjustably positionable over and about an outer perimeter of said washer such that said at least one locking member is selectively engagable in one of said slots when said cover portion is positioned on said washer thereby restricting rotation of said housing relative to said washer, and said cover portion further including at least one resilient tab disposed thereon, said at least one tab being engagable with said washer, thereby allowing said housing to be removably secured to said washer.

20. The fastening device of claim 19, wherein said plurality of fingers are disposed at spaced intervals 360 degrees about said washer, thereby permitting said housing to be selectively positionable 360 degrees about said washer to accommodate a position of said cable.

21. A fastening device for securing an elongate member to a support structure comprising:

a housing having a holding device for supporting said elongate member;

a fixed component fixably securable to said support structure, said fixed component having a center and a perimeter;

a plurality of spaced fingers extending about and from said perimeter and said plurality of spaced fingers forming a plurality of slots therebetween, said fingers each include a lower and upper portion, each of said finger lower portions extending generally outwardly from said center and each of said upper portions extending generally upwardly and inwardly towards said center; and said housing being axially insertable on said fixed component and variably positionable at select angular orientations about said fixed component, such that said holding device is variably positionable about said fixed component.

22. The fastening device of claim 21, wherein said cover portion includes at least one resilient tab which is removably engagable with said fixed component such that said housing is removably securable to said fixed component.

* * * * *